(12) United States Patent
Kim et al.

(10) Patent No.: US 11,387,967 B2
(45) Date of Patent: Jul. 12, 2022

(54) METHOD FOR ALLOCATING ACK/NACK RESOURCE IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 16/486,149

(22) PCT Filed: Mar. 6, 2018

(86) PCT No.: PCT/KR2018/002643
§ 371 (c)(1),
(2) Date: Aug. 14, 2019

(87) PCT Pub. No.: WO2018/164450
PCT Pub. Date: Sep. 13, 2018

(65) Prior Publication Data
US 2019/0363860 A1    Nov. 28, 2019

Related U.S. Application Data

(60) Provisional application No. 62/467,764, filed on Mar. 6, 2017.

(51) Int. Cl.
*H04L 5/00* (2006.01)
*H04W 4/70* (2018.01)
(Continued)

(52) U.S. Cl.
CPC .......... *H04L 5/0069* (2013.01); *H04L 5/0051* (2013.01); *H04L 5/0055* (2013.01);
(Continued)

(58) Field of Classification Search
CPC ... H04L 5/0069; H04L 5/0051; H04L 5/0055; H04L 5/10; H04L 1/18; H04L 1/1812;
(Continued)

(56) References Cited

U.S. PATENT DOCUMENTS 8,787,344 B2 * 7/2014 Malladi ................ H04L 1/1858
370/344
2008/0160912 A1  7/2008 Kim et al.
(Continued)

FOREIGN PATENT DOCUMENTS

CN       101507169       8/2009
CN       101616057       12/2009
(Continued)

OTHER PUBLICATIONS

State Intellectual Property Office of the People's Republic of China Application Serial No. 201880016347.1, Office Action dated Jul. 5, 2021, 7 pages.
(Continued)

*Primary Examiner* — Shukri Taha
(74) *Attorney, Agent, or Firm* — Lee Hong Degerman Kang & Waimey

(57) ABSTRACT

The present invention relates to a method and apparatus for feeding back acknowledgement/negative-ACK (ACK/NACK) by a receiving device in a wireless communication system. Specifically, the method comprises the steps of: receiving data from a transmitting device; and feeding back ACK/NACK for data to the transmitting device, wherein the size of resource for ACK/NACK is determined on the basis of a distance between the transmitting device and the
(Continued)

receiving device. The receiving device is capable of communicating with at least one of another transmitting device, a transmitting device related to an autonomous driving vehicle, a base station or a network.

10 Claims, 10 Drawing Sheets

(51) Int. Cl.
*H04W 76/27* (2018.01)
*H04L 5/10* (2006.01)
(52) U.S. Cl.
CPC .............. *H04L 5/10* (2013.01); *H04W 4/70* (2018.02); *H04W 76/27* (2018.02)
(58) Field of Classification Search
CPC ....... H04W 4/70; H04W 76/27; H04W 4/023; H04W 4/40
See application file for complete search history.

(56) References Cited

U.S. PATENT DOCUMENTS

| | | | |
|---|---|---|---|
| 2008/0253318 | A1 | 10/2008 | Malladi et al. |
| 2009/0022135 | A1 | 1/2009 | Papasakellariou et al. |
| 2009/0207793 | A1 | 8/2009 | Shen et al. |
| 2015/0039958 | A1 | 2/2015 | Vos |
| 2015/0282197 | A1 | 10/2015 | Lee et al. |
| 2018/0367261 | A1* | 12/2018 | Gonzalves Serrano ............ H04L 1/0027 |

FOREIGN PATENT DOCUMENTS

| | | |
|---|---|---|
| CN | 101800633 | 8/2010 |
| CN | 103023627 | 4/2013 |
| CN | 105991243 | 10/2016 |
| WO | 2016162090 | 10/2016 |
| WO | 2017103662 | 6/2017 |

OTHER PUBLICATIONS

PCT International Application No. PCT/KR2018/002643, Written Opinion of the International Searching Authority dated Jul. 7, 2018, 16 pages.
INTEL, "NR HARQ and scheduling timing", 3GPP TSG RAN WG1 Meeting #86bis, R1-1609542, Oct. 2016, 3 pages.
Huawei, et al., "Support of URLLC in DL", 3GPP TSG RAN WG1 Adhoc Meeting, R1-1700401, Jan. 2017, 7 pages.
European Patent Office Application Serial No. 18763197.3, Search Report dated Jul. 27, 2020, 11 pages.
The State Intellectual Property Office of the People's Republic of China Application Serial No. 201880016347.1, Notice of Allowance dated Jan. 6, 2022, 5 pages.
Rahman et al., "Link level investigation of ACK/NACK bundling for LTE TDD", 2009, 5 pages.

* cited by examiner (a) Control-plane protocol stack (b) User-plane protocol stack (a)

(b)

D2D signal transmission from a UE allocated with unit #0

METHOD FOR ALLOCATING ACK/NACK RESOURCE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/002643, filed on Mar. 6, 2018, which claims the benefit of U.S. Provisional Application No. 62/467,764, filed on Mar. 6, 2017, the contents of which are all hereby incorporated by reference herein in their entirety.

TECHNICAL FIELD

The present disclosure relates to a wireless communication system, and more particularly, to a method of allocating an acknowledgement/negative-acknowledgement (ACK/NACK) resource and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the above discussion, the present disclosure describes a method of allocating an ACK/NACK resource in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present disclosure, provided herein is a method of feeding back acknowledgement/negative-acknowledgement (ACK/NACK) by a receiving device in a wireless communication system. The method may include: receiving data from a transmitting device; and feeding back ACK/NACK for the data to the transmitting device. In this case, the size of an ACK/NACK resource may be determined based on a distance between the transmitting device and the receiving device.

The ACK/NACK resource size may be determined as a resource size associated with a specific range corresponding to a distance value depending on reference signal received power (RSRP) or location information based on a predetermined range for the ACK/NACK resource size. In addition, information on the predetermined range and the ACK/NACK resource size mapped to the predetermined range may be indicated through radio resource control (RRC) signaling.

The method may further include transmitting a demodulation reference signal (DMRS) associated with the ACK/NACK to the transmitting device. In this case, a DMRS sequence may be determined based on the ACK/NACK resource size.

An ACK/NACK sequence may be determined based on the ACK/NACK resource size.

Only when the ACK/NACK resource is selected from a resource pool configured for a power-limited receiving device, the ACK/NACK resource size may be determined based on the distance between the transmitting device and the receiving device.

Only when it is indicated through higher layer signal or a control channel that an ACK/NACK size is determined based on the distance between the transmitting device and the receiving device, the ACK/NACK resource size may be determined based on the distance between the transmitting device and the receiving device.

The ACK/NACK resource size may be indicated by the transmitting device based on the distance between the transmitting device and the receiving device.

In another aspect of the present disclosure, provided herein is a method of receiving ACK/NACK by a transmitting device in a wireless communication system. The method may include: transmitting data to a receiving device; and receiving ACK/NACK feedback for the data from the receiving device. In this case, the size of an ACK/NACK resource may be determined based on a distance between the transmitting device and the receiving device.

In a further aspect of the present disclosure, provided herein is a receiving device for feeding back ACK/NACK in a wireless communication system. The receiving device may include a radio frequency unit and a processor. The processor may be configured to receive data from a transmitting device and feed back ACK/NACK for the data to the transmitting device. In this case, the size of an ACK/NACK resource may be determined based on a distance between the transmitting device and the receiving device.

Advantageous Effects

According to the present disclosure, an ACK/NACK resource can be efficiently allocated in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
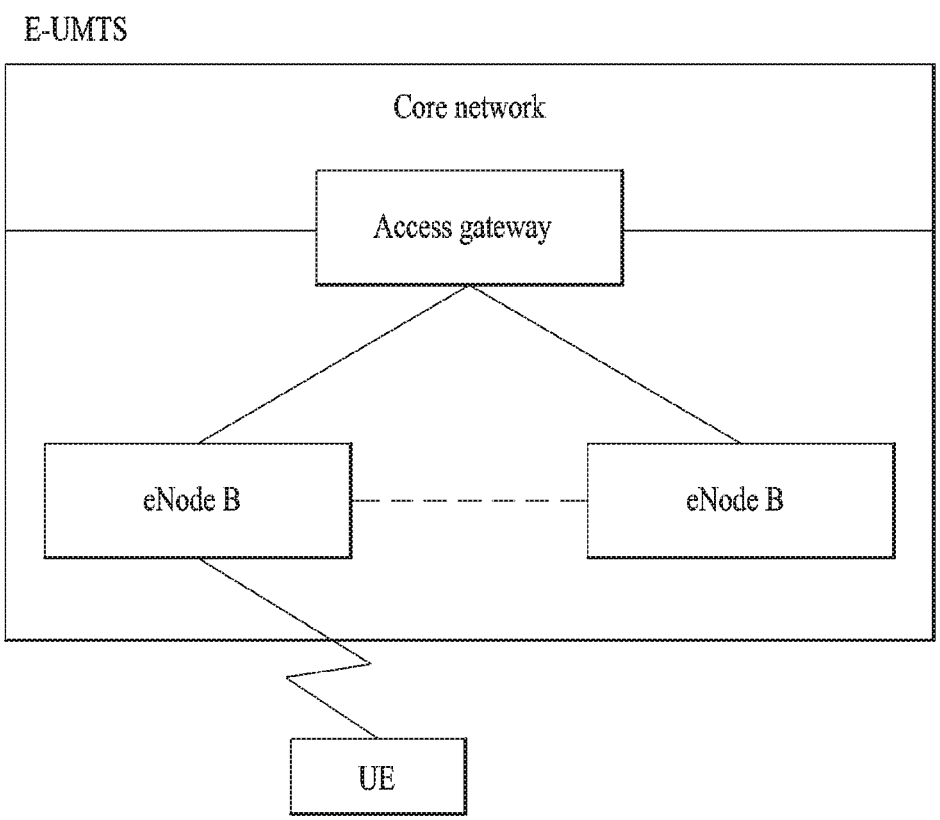
FIG. 1 schematically illustrates an E-UMTS network structure as an example of a wireless communication system.
Figure 2:
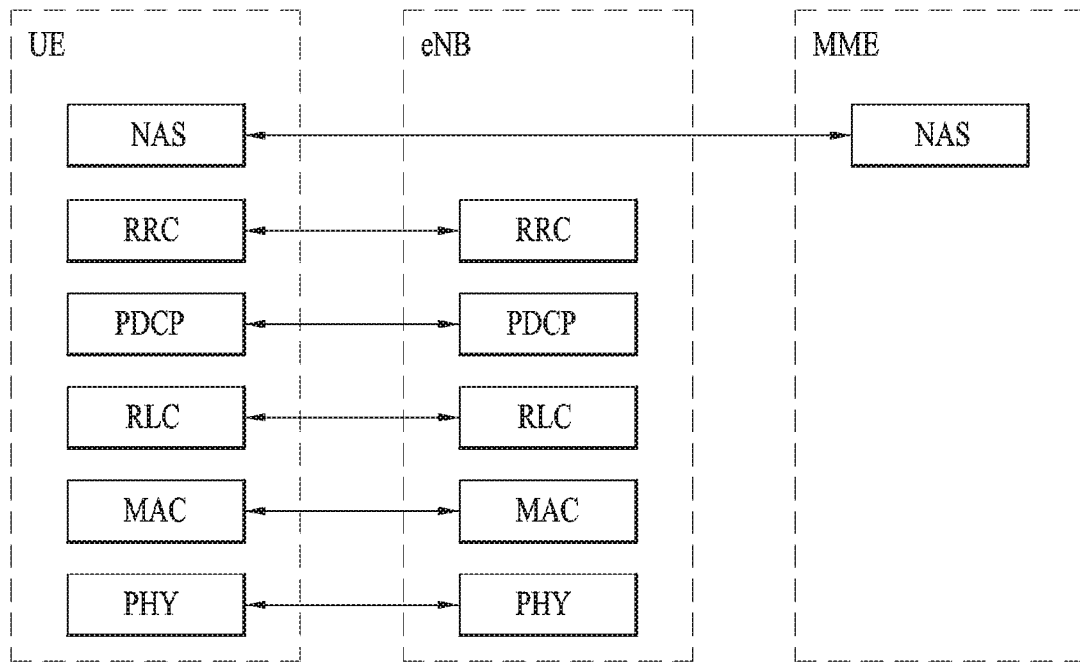
FIG. 2 illustrates control plane and user plane structures of a radio interface protocol between a UE and an E-UTRAN on the basis of the 3GPP wireless access network standard.
Figure 2:
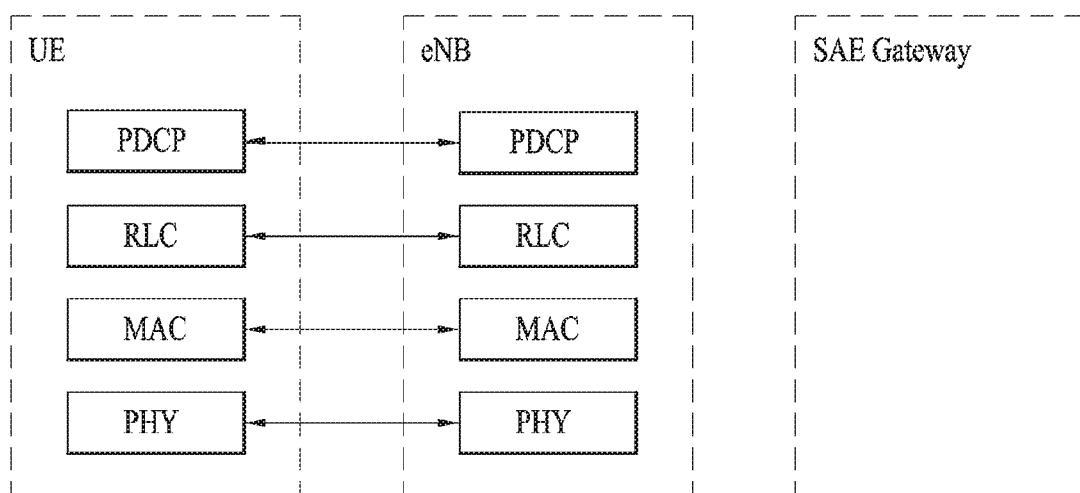

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
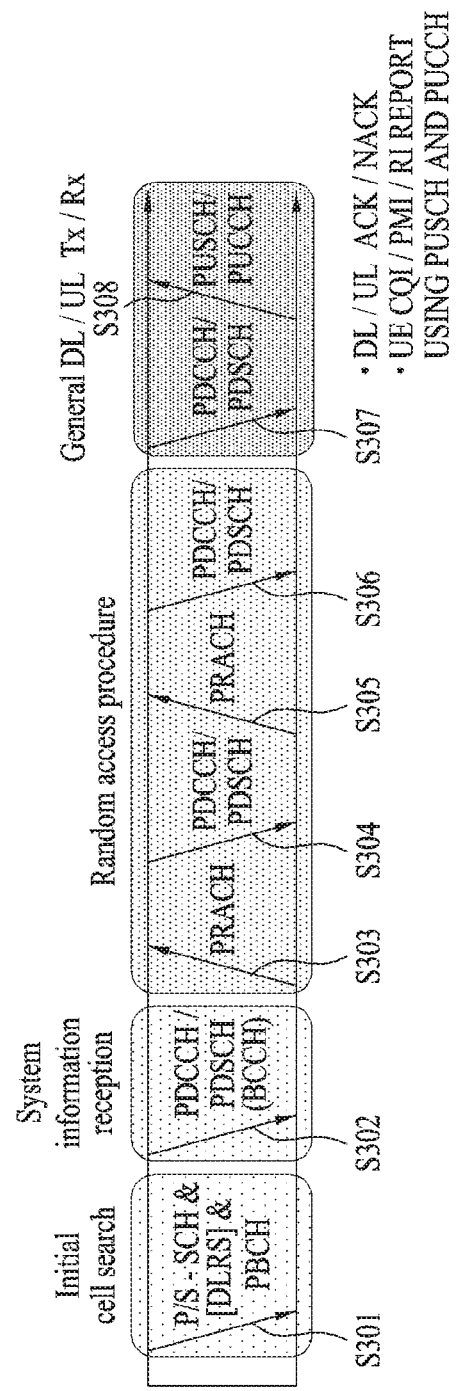
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303) and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
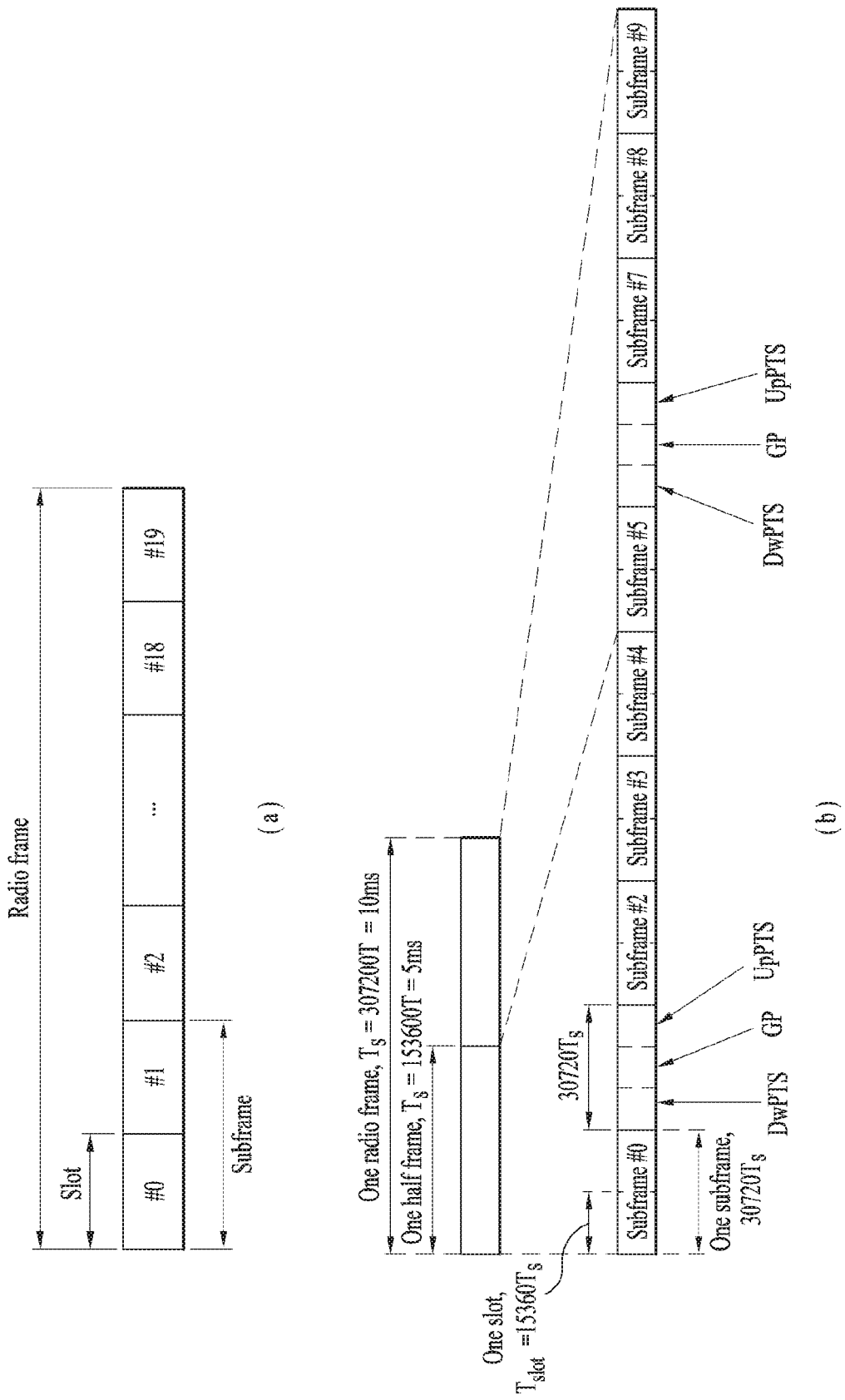
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(*a*) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of Ts=1/(15000×2048), and the other region is configured for the guard period.

frame. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
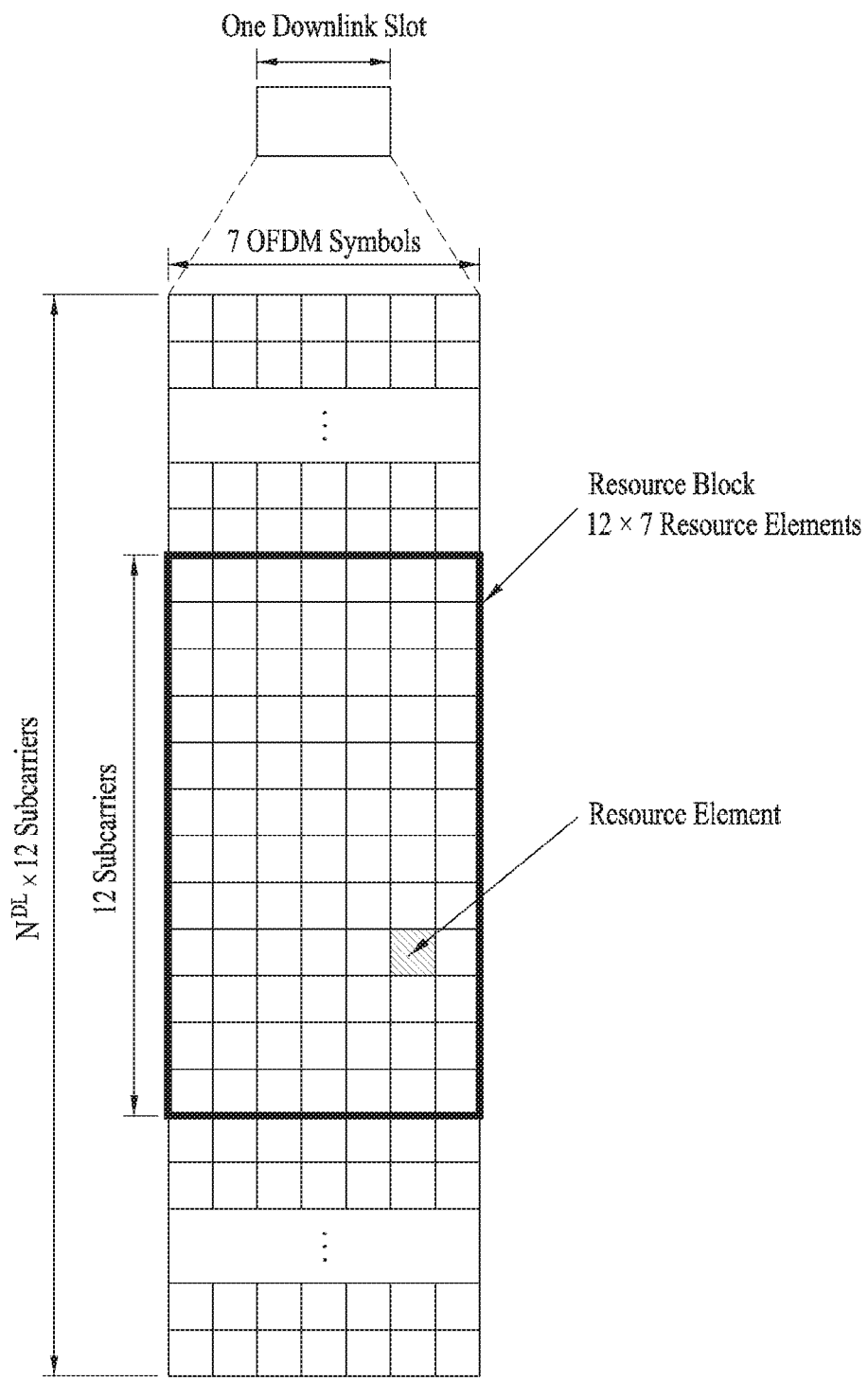
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subresource blocks included in the DL slot depends on a DL transmission bandwidth configured in a cell.

Figure 6:
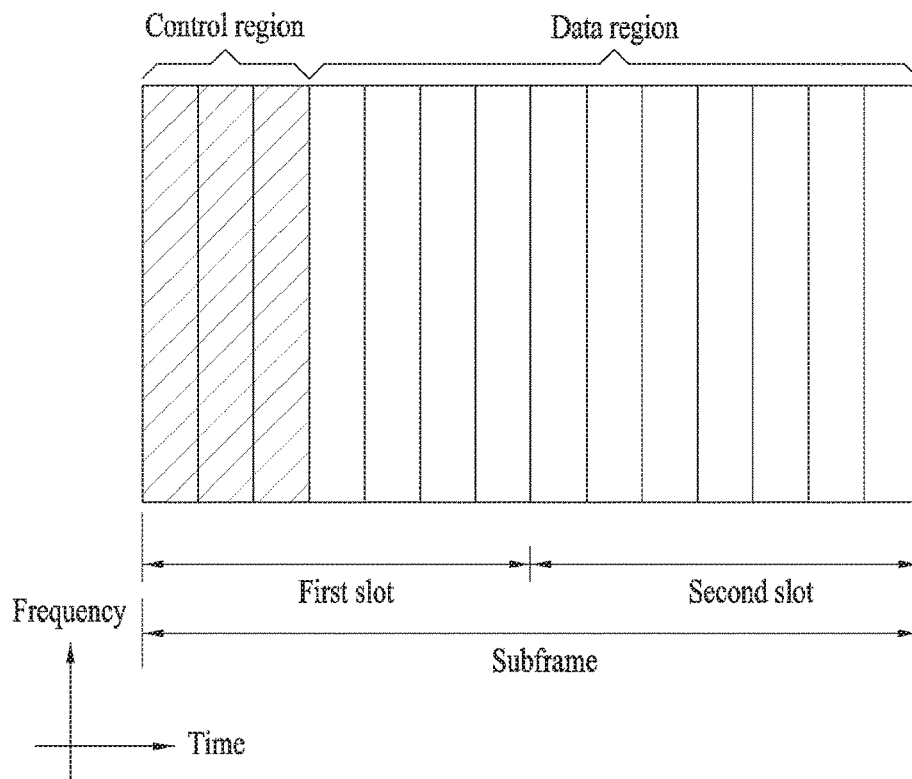
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
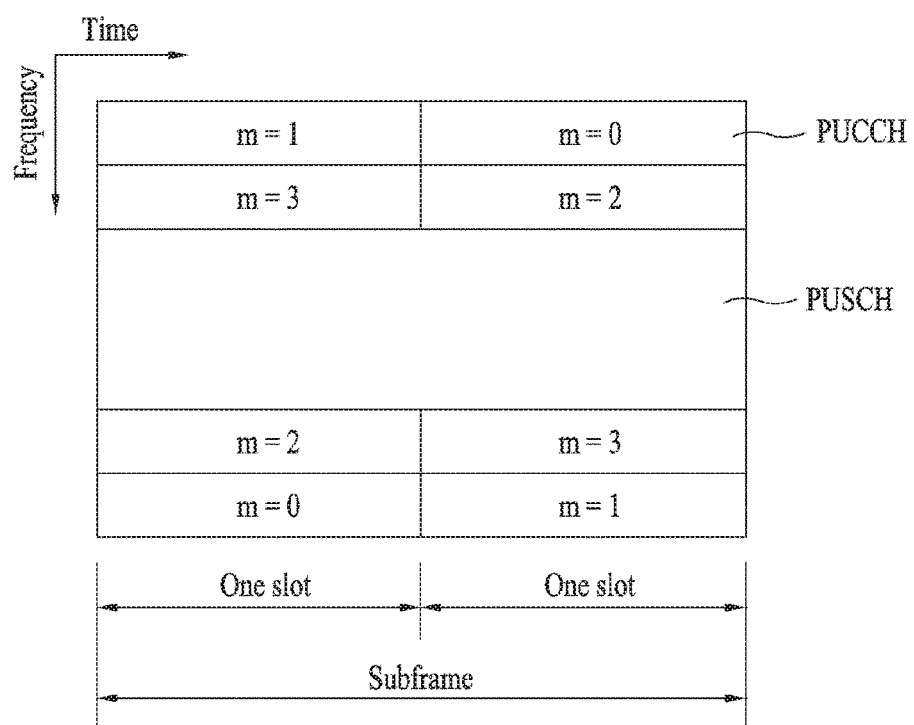
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Figure 8:
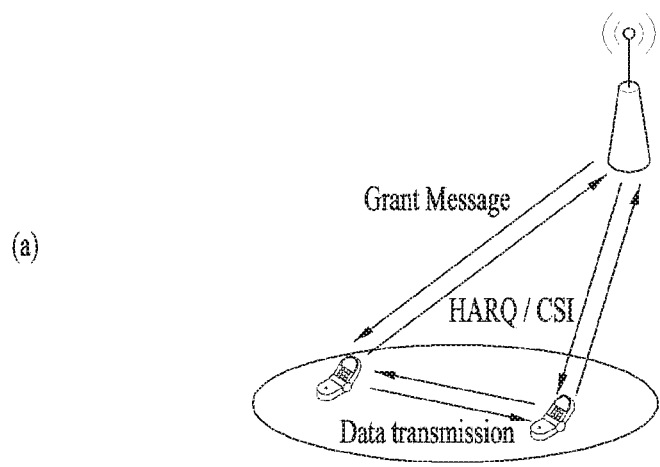
FIG. 8 is a reference diagram to describe D2D (UE-to-UE) communication.
Figure 8:
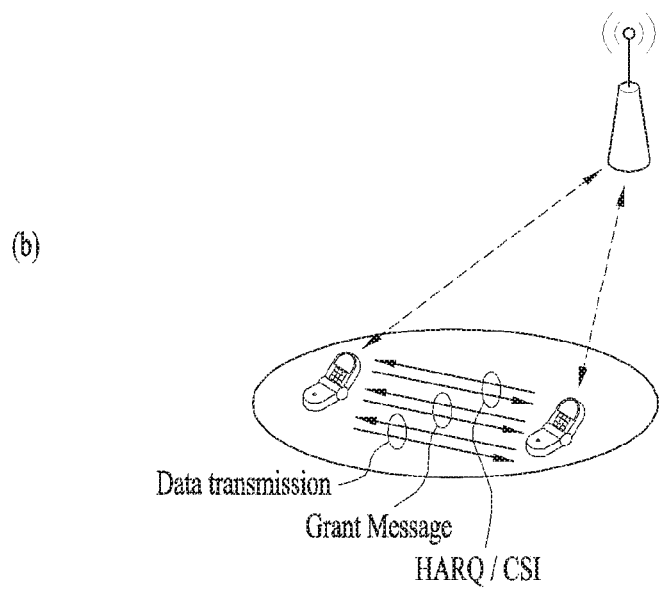

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
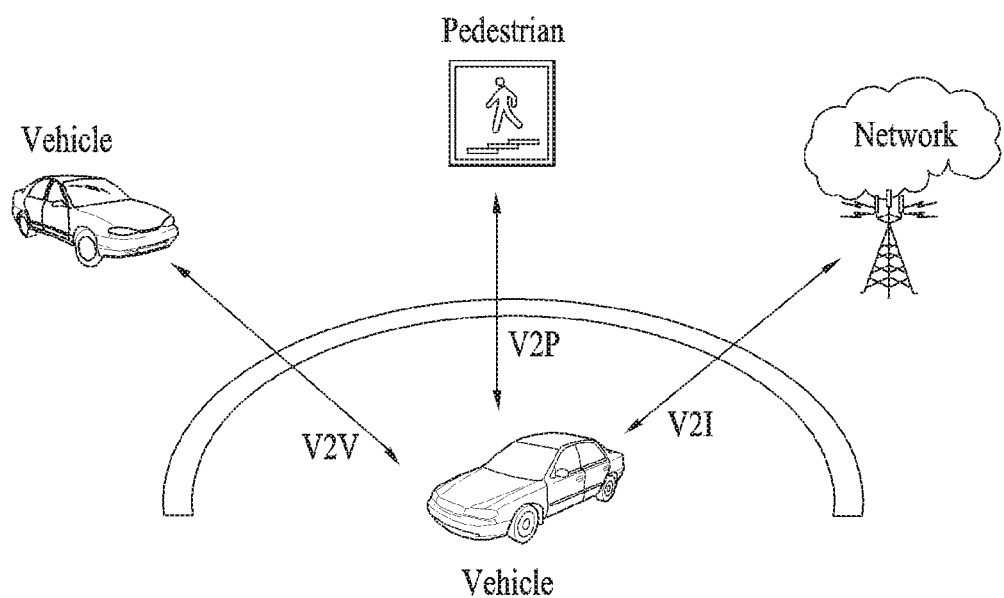
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
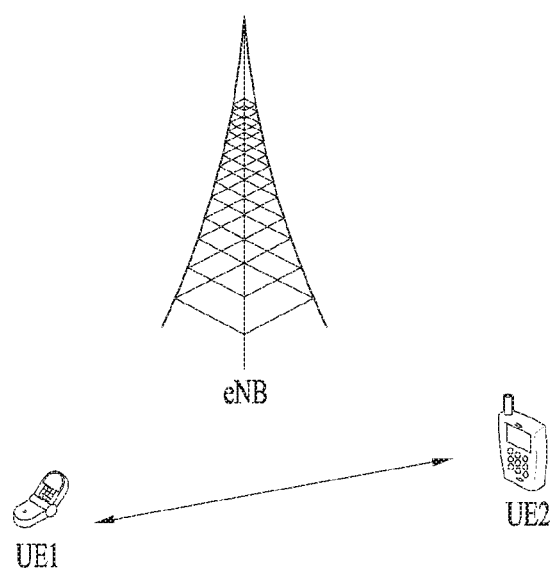
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
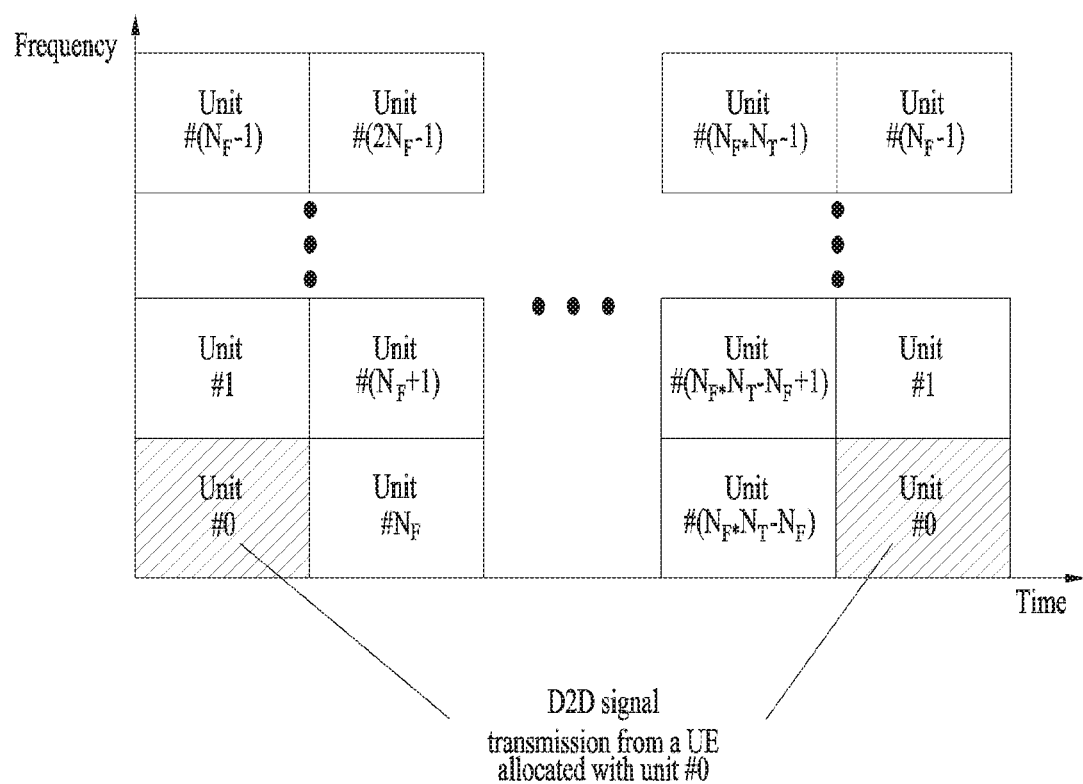

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and then determines whether to become a synchronization source by measuring RSRP of this signal and the like.

It is expected that control and data channels coexist in V2X communication. It is assumed that when control and data channels are associated with each other, multiple vehicles transmit periodic messages. Assuming that a vehicle is a UE, the UE may know the resource locations of currently transmitted messages by decoding the control channel or performing energy sensing on the data channel. In addition, the UE may know even the resource locations to be used by other transmitting UEs.

Based on the above-described technical features, the present disclosure describes a method of solving a problem that when a receiving device located at the edge of coverage of a transmitting device (or a receiving device that receives a signal broadcast by the transmitting end) transmits ACK/NACK, if the reliability of the ACK/NACK transmission to the transmitting device is low, the transmitting device fails to receive the ACK/NACK. Specifically, when a transmitting device transmits a signal within its transmission coverage, a receiving device may receive the signal. However, if the strength of the received signal is low, the reliability of ACK/NACK transmission may be degraded. To solve such a problem, the present disclosure proposes the following methods.

In general, additional resources may be allocated to improve the reliability of transmission. However, considering that there is a limited amount of resources, resource allocation needs to be performed efficiently.

To this end, the HARQ ACK/NACK transmission method has been used in LTE. That is, when an eNB transmits data, a receiving UE attempts to decode the data. If the UE successfully decodes the data, the UE feeds back ACK. On the contrary, if the UE fails to decode the data, the UE feeds back NACK to the eNB. When the eNB receives the NACK, the eNB performs retransmission. Thus, the receiving UE may further improve the decoding success probability using the previous transmission and retransmission. Compared to a method of using many resources for reliability improvement, this method is advantageous in that fewer resources are used to achieve the same purpose.

However, as the distance between the transmitting and receiving devices increases, the decoding failure probability of the receiving device may increase. In addition, when the receiving device transmits NACK to inform the decoding failure, the transmitting device may fail to decode the NACK due to the long distance. Consequently, the receiving end may be likely to fail to receive data. In general, the receiving device may increase power to overcome such failure. However, in some cases, the receiving device cannot further increase the power.

Therefore, the present disclosure proposes a method of configuring a different ACK/NACK resource size depending on the distance between transmitting and receiving devices (or between receiving devices in the case of broadcast transmission).

For example, the distance between transmitting and receiving devices (or between receiving devices in the case of broadcast transmission) may be calculated based on reference signal received power (RSRP) between the transmitting and receiving devices or information on the locations thereof. For example, if the RSRP is high, the distance may be assumed to be short. On the contrary, if the RSRP is low, the distance may be assumed to be long.

Therefore, the ACK/NACK resource size may be changed depending on the range of the relative distance value, which depends on the RSRP or location information. In this case, the RSRP value may mean the power value of a reference signal (RS) transmitted by the transmitting device or the received signal strength indication (RSSI) of a signal including at least one of the transmitted data or the transmitted RS. In addition, mapping between the RSRP value (the relative distance value based on the location information or the RSSI value) and the ACK/NACK resource size value may be provided through RRC signaling.

As another example, when a transmitting device does not know the size of an ACK/NACK resource to be used by a receiving device (or receiving devices in the case of broadcast transmission), if the sequence of a demodulation reference signal (DMRS) transmitted for ACK/NACK demodulation is configured differently for each ACK/NACK resource, the transmitting device may obtain the ACK/NACK resource size by performing blind decoding for the DMRS sequence.

The smallest ACK/NACK resource may be predefined or preconfigured. Using the smallest ACK/NACK resource as a unit, an ACK/NACK resource larger than the smallest ACK/NACK resource may be set to a multiple of the smallest ACK/NACK resource. Thus, each ACK/NACK resource may be obtained by combining a plurality of smallest ACK/NACK resources. In this case, each of the smallest ACK/NACK resources may be configured to have a different DMRS. This could be simply achieved while different ACK/NACK resources are designed. However, the number of required DMRSs may increase as the size of a resource increases.

As a further example, when a transmitting device does not know the size of an ACK/NACK resource to be used by a receiving device (or receiving devices in the case of broadcast transmission), if ACK/NACK is transmitted in the form of a sequence, the ACK/NACK sequence may be configured differently for each ACK/NACK resource size. By doing so, the transmitting device may obtain the resource size by performing blind decoding for the ACK/NACK sequence.

The length of a sequence transmitted on the smallest ACK/NACK resource, which is predefined or preconfigured, may be used as a unit. That is, a sequence transmitted on an ACK/NACK resource larger than the smallest ACK/NACK resource may be configured to have a length corresponding to a multiple of the shortest sequence length. Thus, a sequence transmitted on each ACK/NACK resource may be obtained by repeating a plurality of sequences with the same length as that of the sequence transmitted on the smallest ACK/NACK resources. This may reduce the complexity of blind decoding, which is performed by the transmitting device to estimate the ACK/NACK resource size.

The present disclosure may be applied only to a receiving device having limited power (hereinafter, such a device is referred to as a power-limited receiving device). Specifically, the receiving device may calculate power required for ACK/NACK transmission and then compare the calculated power with power that the receiving device can use for reception. If the former is greater than the latter, the present disclosure may be applied. For example, in the case of a receiving device with no power limitation, the ACK/NACK configuration is not changed for each resource size in a resource pool configured for the corresponding device. However, when ACK/NACK resource allocation is performed using a resource pool configured for a power-limited receiving device, the ACK/NACK configuration may be changed for each resource.

According to the present disclosure, whether the configuration according to the present disclosure is applied or not may be informed by higher layer signaling (e.g., RRC signaling) or control information on a control channel from a transmitting device. For example, when it is indicated that the present disclosure is not applied, a specific ACK/NACK resource may be determined regardless of RSRP (RSSI or a relative distance based on location information) between transmitting and receiving devices.

When the present disclosure is applied, a transmitting device may directly inform a receiving device of an ACK/NACK resource size depending on, for example, RSRP (RSSI or a relative distance based on location information) between the transmitting and receiving devices using control information on a control channel. When the transmitting device directly informs the receiving device of the ACK/NACK resource size, the receiving device may not need to determine the ACK/ANCK resource size.

When the transmitting device directly informs the receiving device of the ACK/NACK resource size, the transmitting device may indicate one of the predetermined ACK/NACK resource sizes (for example, a list of ACK/NACK resource sizes). In this case, if the number of ACK/NACK resource sizes is different or if a different ACK/NACK resource is used, the transmitting device may inform the receiving device of the type of a physical format to be used through higher layer signal (or RRC signaling).

Figure 12:
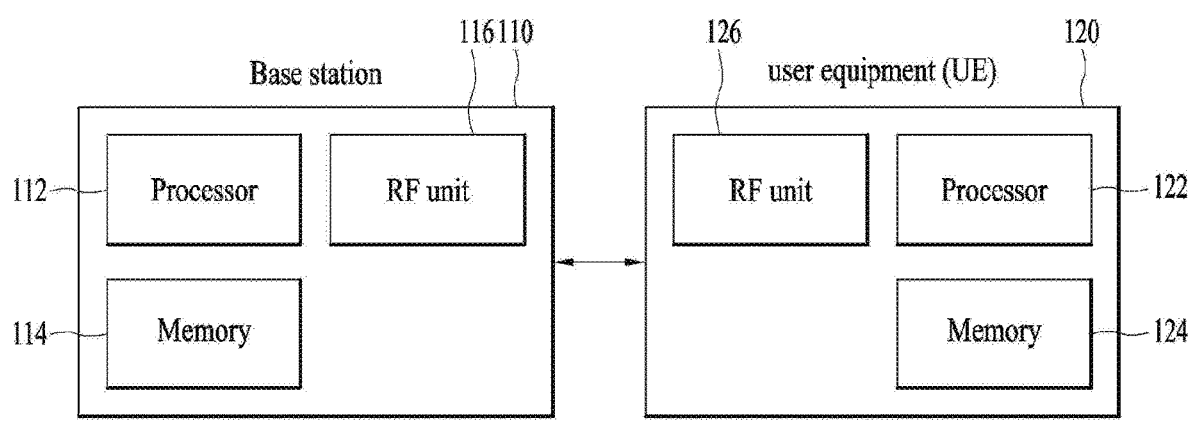
FIG. 12 shows a base station and a user equipment applicable to one embodiment of the present invention.

FIG. 12 illustrates a base station (BS) and a user equipment (UE) applicable to an embodiment of the present invention.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of allocating an ACK/NACK resource in a wireless communication system and apparatus therefor can be applied to various wireless communication systems.

What is claimed is:

1. A method of feeding back acknowledgement/negative-acknowledgement (ACK/NACK) by a receiving device in a wireless communication system, the method comprising:
receiving data from a transmitting device; and
feeding back ACK/NACK for the data to the transmitting device,
wherein a resource size of one or more resources allocated for transmitting the ACK/NACK is determined based on a distance between the transmitting device and the receiving device,
wherein, based on the ACK/NACK being transmitted in the form of a sequence, an ACK/NACK sequence is determined based on the resource size of the one or more resources allocated for transmitting the ACK/NACK,
wherein a smallest length of an ACK/NACK sequence transmitted on a smallest resource of a smallest resource size is used as a unit,
wherein the smallest resource is configured among the one or more resources allocated for transmitting the ACK/NACK, and
wherein a length of an ACK/NACK sequence transmitted on a resource allocated for transmitting the ACK/NACK larger than the smallest resource corresponds to a multiple of the unit.

2. The method of claim 1, wherein the resource size of the one or more resources allocated for transmitting the ACK/NACK is determined as a resource size associated with a specific range corresponding to a distance value depending on reference signal received power (RSRP) or location information based on a predetermined range for the resource size of the one or more resources allocated for transmitting the ACK/NACK.

3. The method of claim 2, wherein information on the predetermined range and the resource size of the one or more resources allocated for transmitting the ACK/NACK mapped to the predetermined range are indicated through radio resource control (RRC) signaling.

4. The method of claim 1, further comprising transmitting a demodulation reference signal (DMRS) associated with the ACK/NACK to the transmitting device, wherein a DMRS sequence is determined based on the resource size of the one or more resources allocated for transmitting the ACK/NACK.

5. The method of claim 1, wherein based on the ACK/NACK resource being selected from a resource pool configured for a power-limited receiving device, the resource size of the one or more resources allocated for transmitting the ACK/NACK is determined based on the distance between the transmitting device and the receiving device.

6. The method of claim 1, wherein based on it being indicated through higher layer signal or a control channel that the resource size of the one or more resources allocated for transmitting the ACK/NACK is determined based on the distance between the transmitting device and the receiving device, the resource size of the one or more resources allocated for transmitting the ACK/NACK is determined based on the distance between the transmitting device and the receiving device.

7. The method of claim 1, wherein the resource size of the one or more resources allocated for transmitting the ACK/NACK is indicated by the transmitting device based on the distance between the transmitting device and the receiving device.

8. A method of receiving acknowledgement/negative-acknowledgement (ACK/NACK) by a transmitting device in a wireless communication system, the method comprising:
transmitting data to a receiving device; and
receiving ACK/NACK feedback for the data from the receiving device,
wherein a resource size of the one or more resources allocated for transmitting an ACK/NACK is determined based on a distance between the transmitting device and the receiving device,
wherein, based on the ACK/NACK being transmitted in the form of a sequence, an ACK/NACK sequence is determined based on the resource size of the one or more resources allocated for transmitting the ACK/NACK,
wherein a smallest length of an ACK/NACK sequence transmitted on a smallest resource of a smallest resource size is used as a unit,
wherein the smallest resource is configured among the one or more resources allocated for transmitting the ACK/NACK, and
wherein a length of an ACK/NACK sequence transmitted on a resource allocated for transmitting the ACK/NACK larger than the smallest resource corresponds to a multiple of the unit.

9. A receiving device for feeding back acknowledgement/negative-acknowledgement (ACK/NACK) in a wireless communication system, the receiving device comprising:
a radio frequency unit; and
a processor,
wherein the processor is configured to receive data from a transmitting device and feed back ACK/NACK for the data to the transmitting device, and
wherein a resource size of one or more resources allocated for transmitting an ACK/NACK is determined based on a distance between the transmitting device and the receiving device,
wherein, based on the ACK/NACK being transmitted in the form of a sequence, an ACK/NACK sequence is determined based on the resource size of the one or more resources allocated for transmitting the ACK/NACK,
wherein a smallest length of an ACK/NACK sequence transmitted on a smallest resource of a smallest resource size is used as a unit,
wherein the smallest resource is configured among the one or more resources allocated for transmitting the ACK/NACK, and
wherein a length of an ACK/NACK sequence transmitted on a resource allocated for transmitting the ACK/NACK larger than the smallest resource corresponds to a multiple of the unit.

10. The receiving device according to claim 9, wherein the receiving device is capable of communicating with at least one of another transmitting device, a transmitting device related to an autonomous driving vehicle, a base station or a network.

* * * * *